Nov. 12, 1957
LE ROY N. HERMANN
2,812,730
ARCHED PANEL SHEET FOR SELF-SUPPORTING TRUSS-FREE BUILDING
Filed Nov. 28, 1956
6 Sheets-Sheet 1
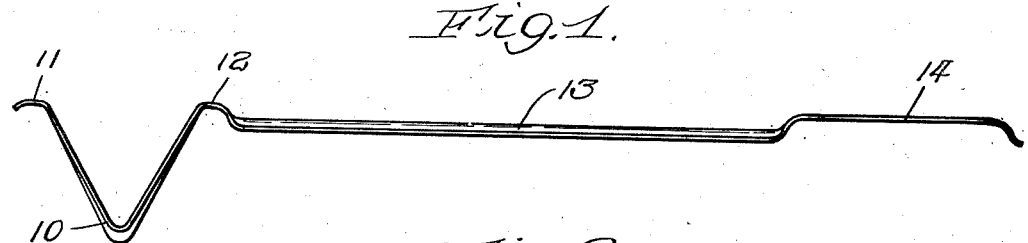
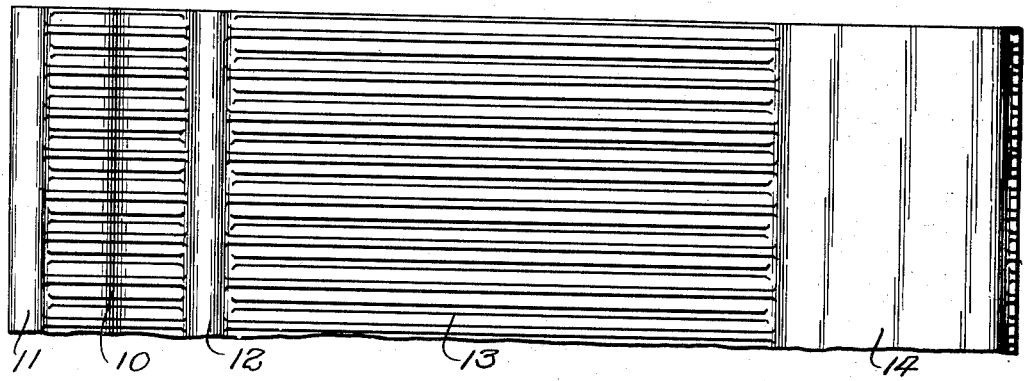
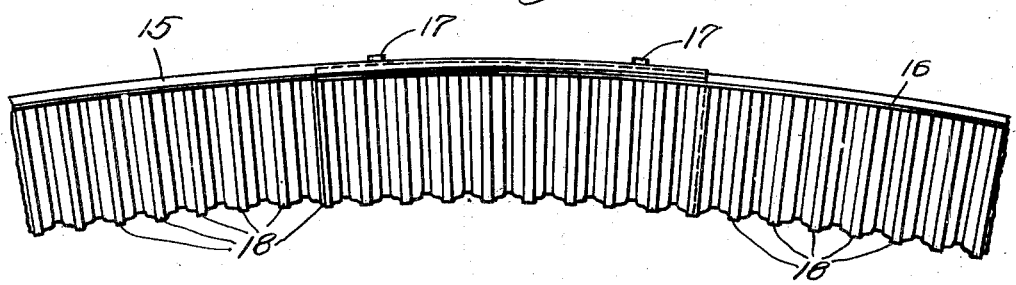
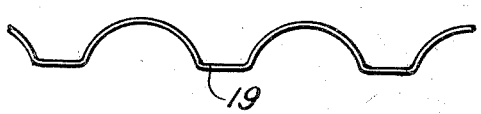
Inventor.
Le Roy N. Hermann,
By Merriam & Lorch,
Attys.

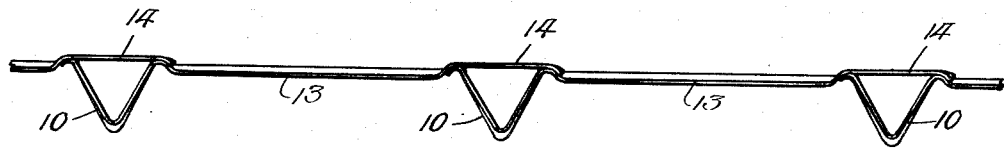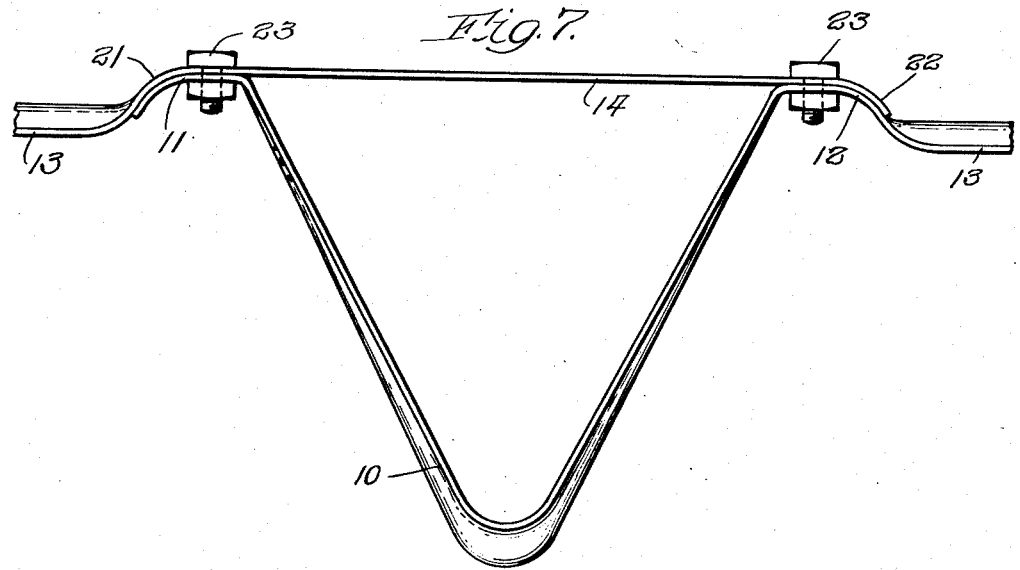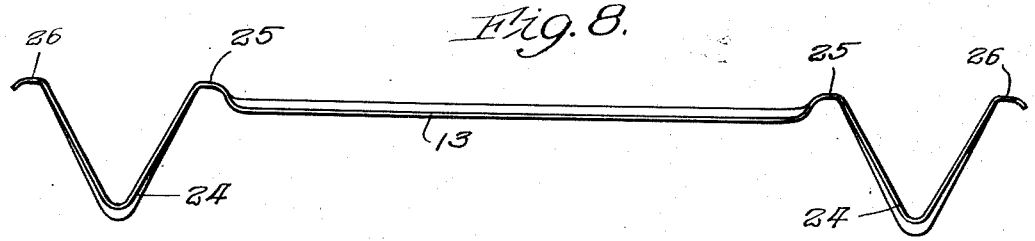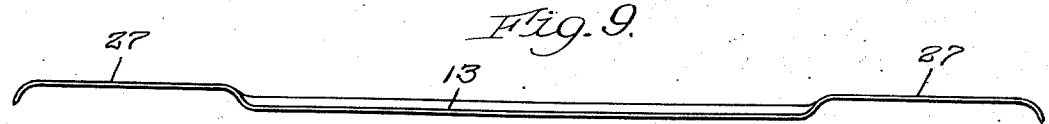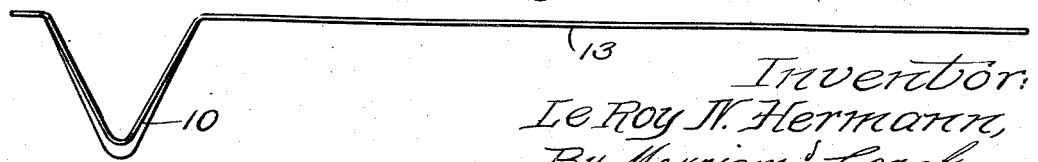

Nov. 12, 1957 LE ROY N. HERMANN 2,812,730
ARCHED PANEL SHEET FOR SELF-SUPPORTING
TRUSS-FREE BUILDING
Filed Nov. 28, 1956 6 Sheets-Sheet 3

Inventor:
Le Roy N. Hermann,
By Merriam, Lorch,
Attys.

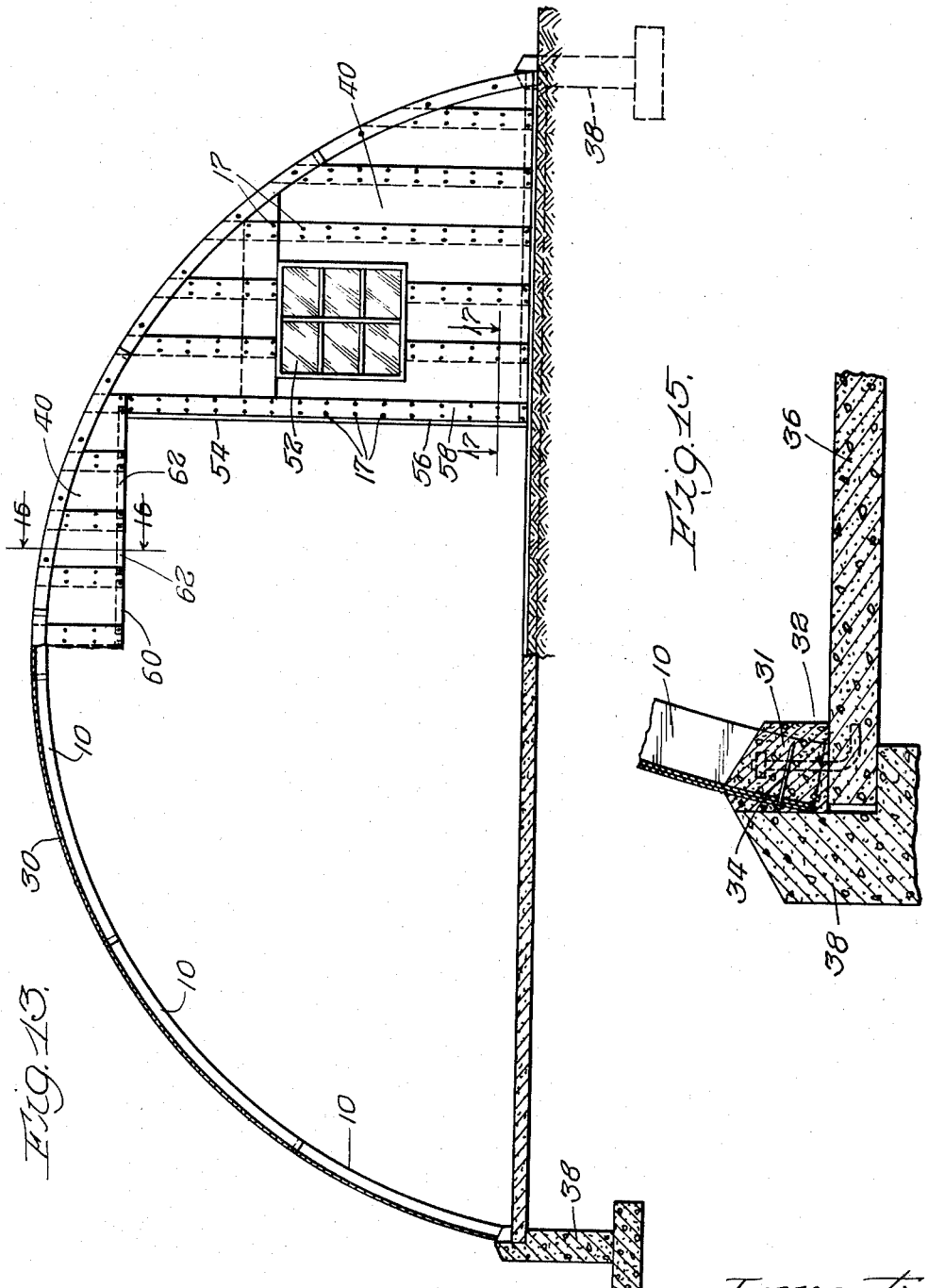

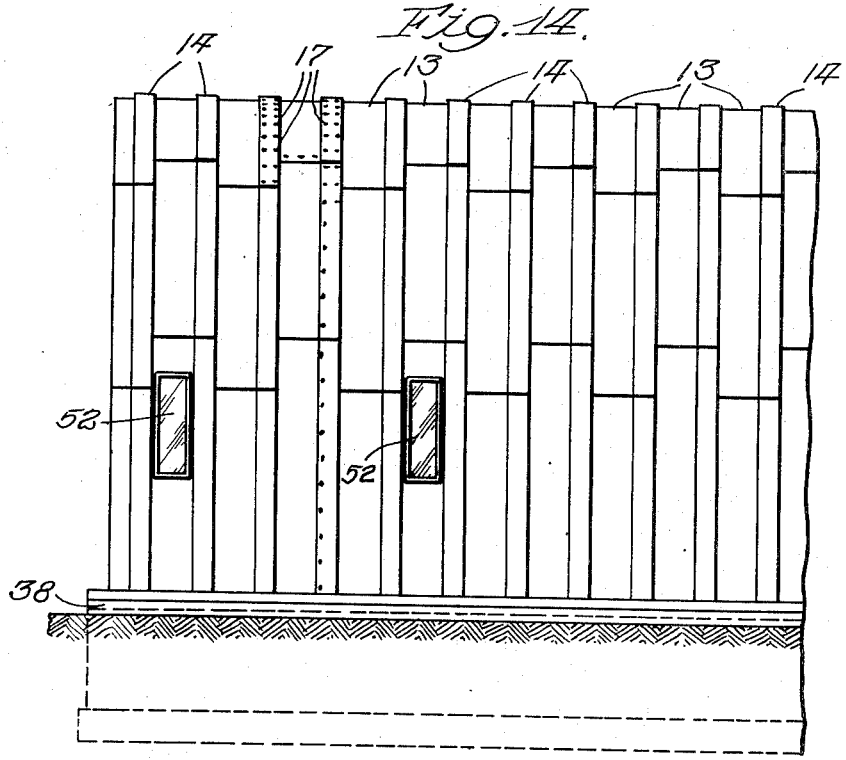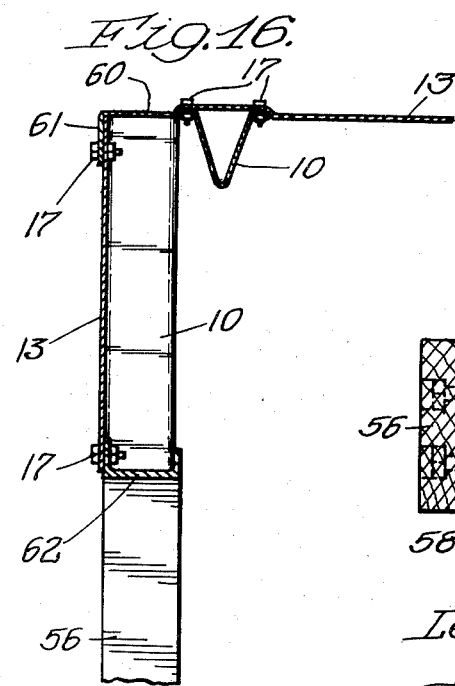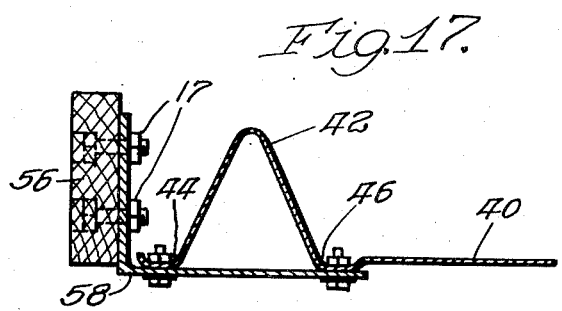

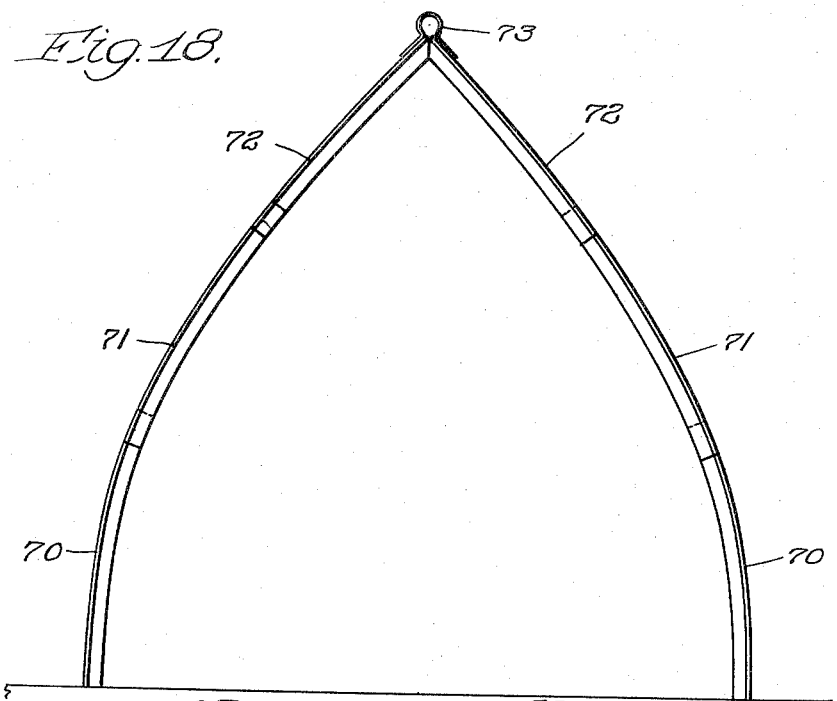
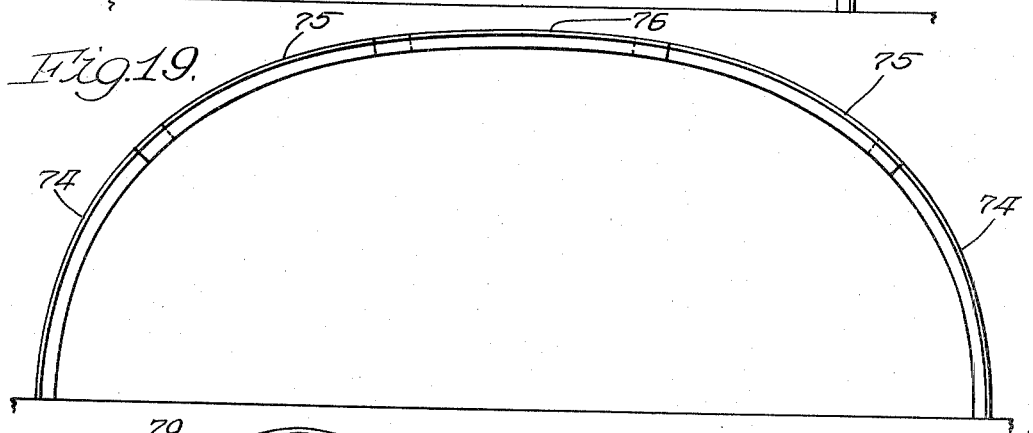
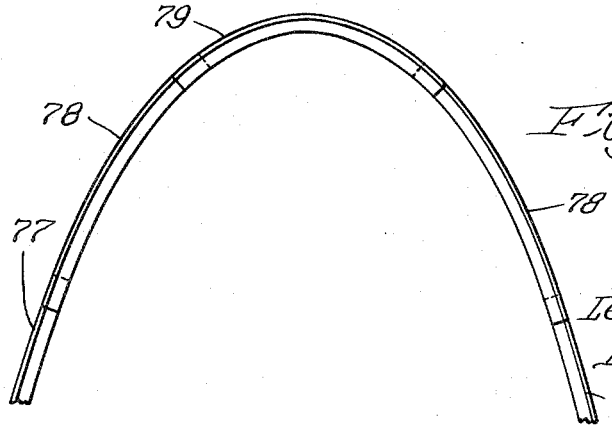

United States Patent Office 2,812,730
Patented Nov. 12, 1957

2,812,730

ARCHED PANEL SHEET FOR SELF-SUPPORTING TRUSS-FREE BUILDING

Le Roy N. Hermann, Piqua, Ohio, assignor to Inland Steel Products Company, a corporation of Delaware Application November 28, 1956, Serial No. 624,814

7 Claims. (Cl. 108—1)

This invention relates to metal buildings. More particularly, this invention is concerned with novel metallic building panels or sheets characterized by an integrally formed brace. It is also concerned with the assembly of such panels to produce an arched self-supporting, truss-free building structure as well as retaining walls produced from such panels.

This application is a continuation-in-part of my application Serial No. 485,720, filed February 2, 1955, and Serial No. 332,284, both now abandoned, and is related to my application Serial No. 332,283, now Patent No. 2,775,284, both filed January 21, 1953 and is a continuation-in-part of my application Serial No. 454,493, filed September 7, 1954.

One object of this invention is to provide a braced panel sheet for building construction.

Another object is to provide elongated braced panel sheets which can be assembled together to form an arched building without the use of added braces or trusses.

Another object is to provide a panel sheet of novel structural shape such that when several sheets are assembled to form a building unit cooperative interlocking of the panels is achieved.

An additional object is to provide an arched trussless metal building assembled of building panels having an interlocking system which gives great strength and rigidity to the structure.

The invention will now be described with reference to the attached drawings in which:

Figure 1 is a cross-sectional view of a braced building sheet or panel;

Figure 2 is a partial plan view of the building sheet shown in Figure 1;

Figure 3 is a cross-sectional view through the V-brace of arced building sheets in partial overlapping longitudinal alignment;

Figure 4 is a cross-sectional view of representative corrugations which may be formed in the bracing element of the sheets;

Figure 5 is a cross-sectional view of another form of corrugation which may be put in the bracing element;

Figure 6 is a cross-sectional view of several building sheets assembled adjacent to each other;

Figure 7 is an enlarged cross-sectional view showing the bracing section of a panel overlapped by the complementary brace-engaging section of a similar panel;

Figure 8 illustrates another form of building sheet having braces along each edge;

Figure 9 shows a building panel with complementary brace-engaging sections along each edge adapted for use in conjunction with the building section of Figure 8;

Figure 10 is a sectional view of a panel sheet having an integral brace along one longitudinal edge but which is otherwise smooth faced;

Figure 13 is an end elevational view of a building constructed in accordance with my invention, with a portion of the same being broken into section as well as part of the end wall removed to more clearly show other portions;

Figure 14 is a fragmentary side elevational view of the building;

Figure 15 is an enlarged fragmentary view showing the manner in which the lower ends of the building panels are interlocked with the foundation and floor of the building;

Figure 16 is a vertical sectional view taken at line 16—16 of Fig. 1 and shows the connection of the end wall and door opening with the transversely extending building panels;

Figure 17 is a plan sectional view taken at line 17—17 of Fig. 13 and shows the construction at the door jamb of the door opening in the end wall of the building;

Figure 18 is an end view of a building formed in the general shape of a gothic arch from arced panels;

Figure 19 is an end view of a building generally semi-elliptical in shape formed of the arced panels; and Figure 20 is a partial end view of a building generally parabolic in shape formed of the arced panels.

Figure 11:
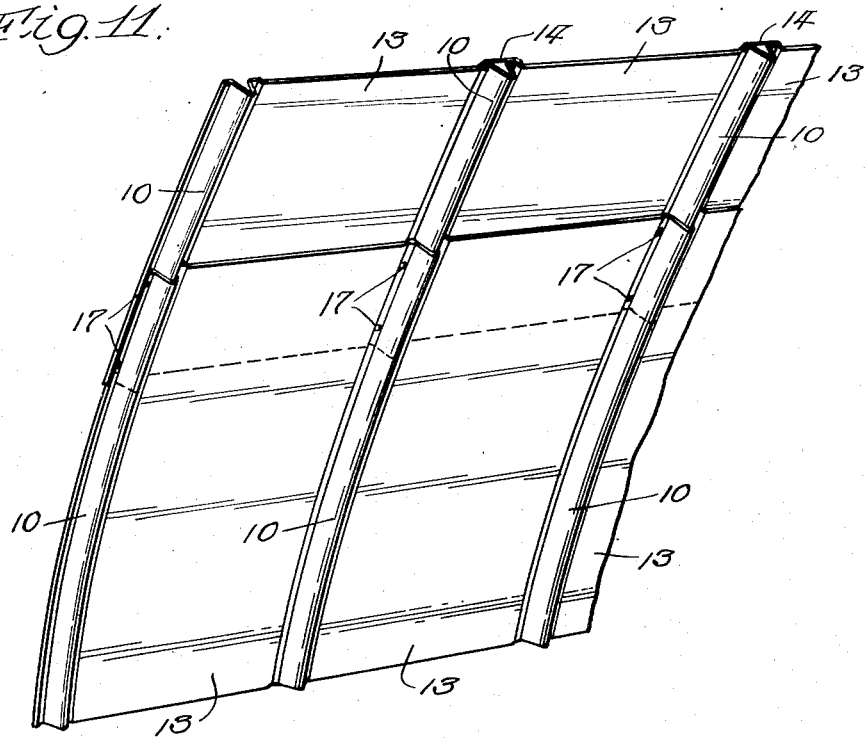
Figure 11 is a partial view of a building unit formed from arced building sheets.

The building sheets provided by this invention are essentially elongated rectangular metallic sheets having an integrally formed bracing element in the form of a V along one edge of the sheet. The V-brace extends the full length of the sheet. One typical metallic building sheet as shown in Figure 1 has V-brace 10 along one edge of the panel which culminates in the offset or beaded flange 11 at the upper, outer edge of the V-brace. The inner, upper edge of the V-brace contains offset section 12 leading into central body area 13 of the panel, which area is preferably transversely corrugated to stiffen the body. Offset portion or section 14 at the other longitudinal edge of the sheet is complementary offset and adapted to overlap the V-brace of an adjacent sheet having offsets corresponding to 11 and 12. The panel of Figure 1 is further illustrated by Figure 2 which is a plan view of a part of such a panel.

V-brace 10 is transversely corrugated at the extremities thereof and preferably over its entire length. The transverse corrugations are parallel to each other and preferably lead into, or are narrowly separated from, the next adjacent corrugation. Such corrugations are formed in and preferably extend continuously from one leg of the V-brace, around the apex and to the other leg of the V. The depth or displacement of the corrugations in the V is preferably reduced or tapered as they proceed up so that the corrugations terminate in the vicinity of the top of the V.

The panel illustrated in Figures 1 and 2 may be straight or arced longitudinally. Arced panels in partial overlapping longitudinal alignment are illustrated in Figure 3 in which panel 15 overlaps panel 16 and the view is a cross-section through the V-braces. The panels are arced in a segment of an arch and have the apex of the V-brace on the inside of the arch and substantially below the surface of the central body area of the panel. Fastening means such as bolts 17 are used to hold the panels close together. The uniformly shaped and spaced corrugations 18 in the V-brace of the panels are formed so that they are complementary and mesh when overlapped. The corrugations in the V-brace may be regular sine wave corrugations or variations thereof such as illustrated by Figures 4 and 5.

The transverse corrugations in the V-brace are an essential element of this invention because of the great strength thereby imparted to building units assembled from such panels. Through such corrugations, a locking effect is achieved over that part of the V-brace positioned in overlapping alignment with another similar panel. Almost all longitudinal forces are thereby distributed throughout the locked or overlapped V-braces. Through this distribution of force, panels and building units of greater strength are produced. Forces which would otherwise be exerted as shear on the bolts alone are substantially transferred to the overlapping corrugations of the V-braces. Remaining forces on the bolts are converted from shear to tension. Since a bolt can withstand over three times as much tensile as shearing force, the joint is greatly increased in this respect also. In the absence of corrugations in the V-brace not only would the bolts be subjected to shear but, in addition, tearing at the holes would be difficult to avoid because of the relatively thin metal and lack of bearing area at the holes to distribute the forces. By transferring the forces to the overlapped corrugations and away from the bolts much greater strength is achieved.

It is not essential that the entire length of the V-brace be transversely corrugated. Panels which are to be used as end walls or as substantially flat, but vertical building units, may have only the overlapping areas of the V-braces corrugated. However, panels arced in a segment of an arch are preferably corrugated transversely the entire length of the V-brace.

With further reference to Figures 4 and 5, the flat areas 19 and 20 in these corrugations give an even greater locking effect than is achieved with overall curved or sine wave corrugations.

The panels of this invention may be placed in side-by-side position to produce building units of any desired width. In Figure 6 there are shown panels in side-by-side position in which V-brace 10 is overlapped by the brace-engaging section 14 of an adjacent similar panel. Figure 7 illustrates in greater detail the joining of such panels in side-by-side position. In this figure V-brace 10 has offset sections 11 and 12 which have a contour similar to and adapted to fit against areas 21 and 22 respectively of brace-engaging area 14. Fastening means such as bolts 23 hold the panels together firmly. Complementary offset areas 12–22 and 11–21 effect a locking that distributes lateral forces over the entire length of these ribs thereby substantially eliminating shearing forces on the bolts and converting whatever forces are exerted on the bolts to tension. The joint is, accordingly, one of great strength and rigidity.

The panel of Figure 8 has similar V-braces 24 along each longitudinal edge with offset areas 25 and 26 as described in regard to the previous figures. The V-braces, of course, are transversely corrugated at the extremities thereof and preferably over the entire length thereof if arced. Such a panel may be used with a panel of Figure 9 having brace-engaging sections 27 at each longitudinal edge. To form an arched building unit the panels of Figures 8 and 9 may be used side-by-side in alternative order and may extend longitudinally as desired.

In Figure 10 there is shown a panel having a V-brace along one longitudinal edge. The V-brace is transversely corrugated but no offset sections have been provided at the top of the legs of the V as in Figure 1. Such a panel may be used where lateral forces are at a minimum.

Figure 12:
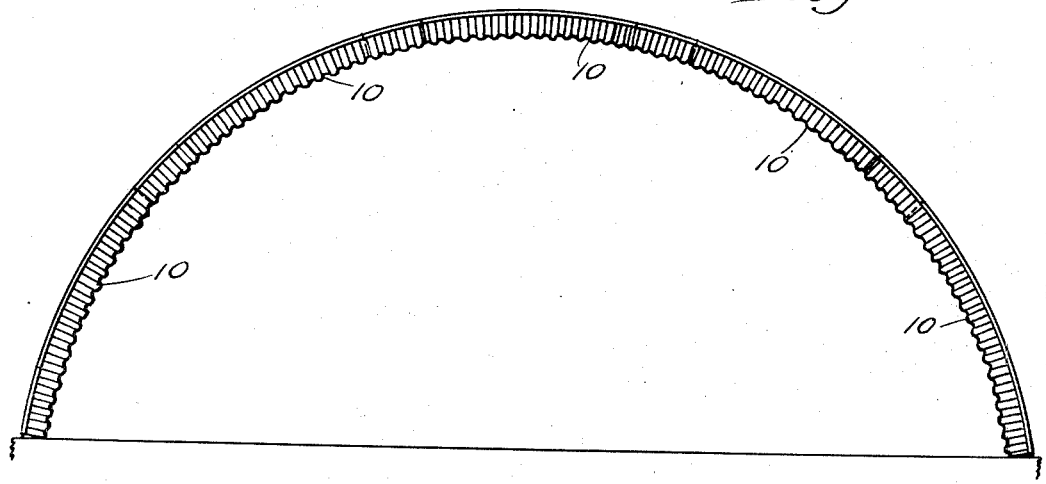
Figure 12 is an end view of an arched building formed by arced panels in longitudinal overlapping alignment.

A building unit such as may be constructed of panels arced in a segment of an arch is illustrated by Figure 11. In Figure 12 is shown an end view of an arched building without end walls such as may be constructed by assembling arced panels provided by this invention. When so assembled a rigid, self-supporting building is obtained which requires no cross-braces or trusses to support the roof or walls. By reason of the use of similar arced panels, as in Figure 12 where the panels are arced in segments of a circle, as well as straight sheets, it can be readily seen that a building of any desired size can be easily and quickly constructed. Doors and windows may be provided wherever desired.

Other arched building structures may be formed employing panels arced dissimilarly as shown in Figures 18—20. A Gothic arch is shown in Figure 18 made of panels 70, 71 and 72 having a different arc. Thus, both panels 70 are similarly arced but are arced differently than panels 71 and 72. Rigid peak 73 secures the arches at the top. It is to be understood that panels 70–72 have a cross-section as shown in Figure 1 and are corrugated and overlapped as in Figure 3.

The semi-elliptical building of Figure 19 is made of arced panels 74, 75 and 76 which will be seen to be arced progressively different from one end of the panels to the other end. A building of this shape is particularly useful for covering wide areas of floor space with a minimum of material.

Figure 20 shows a partial end view of a structure parabolic in shape made of arced panels 77, 78 and 79 formed and lapped essentially as in Figures 1 and 3. Both panels 77 are alike, as are both of panels 78; however, the arc of panels 77, 78 and 79 are different. The panels are like Figure 1 in cross-section and are laterally corrugated as in the V-brace, and lapped, as in Figure 3.

In Figure 13 I have shown a building 30 which may be constructed of the braced arcuate panels or sheets. The arched sheets are fastened together along their edges by means of bolt members 17 at spaced intervals, the bolts 17 being adapted to pass through the bead portions 11 and 12 of each of the sheets and the brace-engaging cover 14 of adjacent sheets. The bolts 17 are preferably provided with an aluminum washer on the outside of the building, and a square nut positioned on the inside against the walls of the raised beads 11 and 12 of the V-shaped brace to prevent them from turning. A neoprene washer may be provided on the inside of the openings through which the bolts pass so that when the bolts are fastened down, a moisture-proof connection is obtained.

In order to form an arch of a desired size, as many arched sheets or panels as desired may be connected together as shown in Figure 3 by the bolt members 17. As shown in Figure 15, the lower ends 31 of the arched sheets may be embedded in a cement grouting 32 and be anchored in the same by spikes 34 or other similar fastening means. The grouting 32 is placed upon the foundation and floor of the building after the same has been poured. The floor 36 of the building is preferably concrete of any desired thickness placed upon a rectangular foundation 38 which has previously been made.

The end walls of the building 30 may be formed of panel sheets which are similar in configuration to the arched sheets except that they are straight rather than arched and preferably have no lateral corrugations in the V-brace. Adjacent straight panels 40 are fastened together by similar bolts 17 at desired intervals throughout the length of the panels and by lapping the sheets 40 to any desired distance and fastening the same together by the bolt members 17, the flat wall may be extended to any height.

Suitable windows 52 may be placed where desired, the sheets being cut to a desired size and the window, preferably a standard steel window, being bolted into place in the opening provided.

In the building shown in Figure 13 the doorway 54 may include the vertical door jamb 56 on both sides of the same, the door jamb being bolted to an angle member 58 which is fastened to the front side of one of the panels 40, fastened thereto by the bolt members 17 through the beads 44 and 46 at the sides of the V-shaped brace 42. The upper edge 60 of the door opening, as best shown in Figure 16 may be constructed with channel members 62 which extend between the V-braces 10 of the wall panels 40 to provide a rigid bracing at the upper edge of the door opening 54. As can also be seen in Figure 16, the edge arched panel 60 at the end of the building is formed with a downwardly depending flange 61 which is fastened to the flat side panels 40 by suitable bolt members 17.

Formation of the panels described above is readily achieved by the use of sheet metal working tools and equipment such as press brakes and the like. The design of dies for making such panels on press brakes will be obvious to those skilled in the art.

Sheet metal, preferably galvanized, and of about 18 gauge is suitable for use in the panels. Heavier or lighter gauge sheet may be used if desired. In place of steel, other metal sheet such as aluminum may be employed.

Various changes and modifications of the invention can be made and, to the extent that such variations incorporate the spirit of this invention, they are intended to be included within the scope of the appended claims.

What is claimed is:

1. A rectangular sheet metal panel longitudinally arced in a segment of an arch comprising a central longitudinal body area, an integral V-shaped brace formed along the full length of one longitudinal edge of the panel having the apex of the V-brace on the inside of the arch and substantially below the surface of the central body area, and an offset portion along the other longitudinal edge of the panel forming an inverted shallow trough the full length of the panel, the V-brace further having transverse uniformly shaped and spaced corrugations terminating in the upper part of the legs forming the V-brace, the corrugations being continuous from one end of the V-brace to the other end, said panel also having longitudinal ribs adjacent the top of each leg of the V-brace raised above the surface of the central body area, the offset portion having a width substantially the same as that between the outer edges of the ribs and a height substantially the same as the ribs above the central body area, and the top and outer edges of the ribs having a contour corresponding to the underside longitudinal wall areas of the offset portion, the said panel being such that longitudinal alignment of a plurality of such panels in partial overlapping nesting arrangement with the lateral corrugations in the V-brace of one panel meshing with the lateral corrugations in the V-brace of an overlapping panel forms an arch, the longitudinal offset portion of one panel being adapted to span and cap the V-brace and ribs of an adjacent similar panel.

2. A rectangular sheet metal panel longitudinally arced in a segment of an arch comprising a central longitudinal body area, an integral V-shaped brace formed along the full length of one longitudinal edge of the panel having the apex of the V on the inside of the arch and substantially below the surface of the central body area, and an offset portion along the other longitudinal edge of the panel the full length of the panel, the V-brace further having transverse uniformly shaped and spaced corrugations terminating in the upper part of the legs forming the V-brace, the corrugations being continuously positioned from one end of the V to the other end, the offset portion having a width at least as wide as the V-brace, the said panel being such that longitudinal alignment of a plurality of such panels in partial overlapping nesting arrangement with the lateral corrugations in the V-brace of one panel meshing with the lateral corrugations in the V-brace of an overlapping panel forms an arch, the longitudinal offset portion of one panel being adapted to cap the V-brace of an adjacent similar panel.

3. An arched sheet metal building unit comprising similar arches in side-by-side partial overlapping relationship with adjacent arches, each arch being formed of substantially identical rectangular sheet metal panels longitudinally arced in a segment of an arch and placed in longitudinally aligned partial overlapping relationship with consecutive panels to form each arch; each such panel having an integral V-shaped brace formed along the full length of one longitudinal edge of the same, the apex of the V being on the inside of the arch and substantially below the surface of the central body area, and an offset portion along the other longitudinal edge of the panel the full length of the panel, the V-brace further having transverse uniformly shaped and spaced corrugations terminating in the upper part of the legs forming the V-brace, the corrugations being continuously positioned from one end of the V-brace to the other end, the offset portion having a width at least as wide as the V-brace; the panels in longitudinal partial overlapping arrangement nesting with the lateral corrugations in the V-brace of one panel meshing with the lateral corrugations in the V-brace of an overlapping panel, and the longitudinal offset portion of one panel spanning and covering the V-brace of an adjacent similar panel, and means for securing the panels into arches and to adjacent similar arches, said securing means being primarily in tension rather than shear.

4. An arched sheet metal building unit comprising similar arches in side-by-side partial overlapping relationship with adjacent arches, each arch being formed of substantially identical rectangular sheet metal panels longitudinally arced in a segment of an arch and placed in longitudinally aligned partial overlapping relationship with consecutive panels to form each arch; each such panel having an integral V-shaped brace formed along the full length of one longitudinal edge of the same with the apex of the V-brace on the inside of the arch and substantially below the surface of the central body area, and a longitudinal cover portion along the full length of the other longitudinal edge of the panel slightly wider than the V-brace, the V-brace having transverse uniformly shaped and spaced corrugations terminating in the upper part of the legs forming the V-brace, the corrugations being positioned from one end of the V-brace to the other end; the panels in longitudinal partial overlapping arrangement nesting with the lateral corrugations in the V-brace of one panel meshing with the lateral corrugations in the V-brace of an overlapping panel, and the cover portion of one panel spanning and capping the V-brace of an adjacent similar panel, and means for securing the panels into arches and to adjacent similar arches, said securing means being primarily in tension rather than shear.

5. A rectangular sheet metal panel longitudinally arced in a segment of an arch comprising a central longitudinal body area, and an integral V-shaped brace formed along the full length of each of the longitudinal edges of the panel, the apex of each V-brace being on the inside of the arch and substantially below the surface of the central body area, each V-brace further having transverse uniformly shaped and spaced corrugations terminating in the upper part of the legs forming the V-brace, the corrugations being continuous from one end of the V-brace to the other end, the said arced panel being such that longitudinal alignment of a plurality of such panels in partial overlapping nesting arrangement with the lateral corrugations in each V-brace of one panel meshing with the lateral corrugations in each corresponding V-brace of an overlapping panel forms an arch, and means securing the panels together, said means being primarily in tension rather than shear.

6. An arched sheet metal building unit comprising a first type arch made of rectangular sheet metal panels longitudinally arced in a segment of an arch with an integral V-shaped brace formed along the full length of each of the longitudinal edges of the panel, the apex of each V-brace being on the inside of the arch and substantially below the surface of the central body area, each V-brace further having transverse uniformly shaped and spaced corrugations terminating in the upper part of the legs forming the V-brace, the corrugations being continuous from one end of the V-brace to the other end, said arch being formed of a plurality of such panels longitudinally aligned in partial overlapping nesting arrangement with the lateral corrugations in each V-brace of one panel meshing with the lateral corrugations in each corresponding V-brace of an overlapping panel, and a second type arch made of rectangular sheet metal panels longitudinally arced in a segment of a circle which have a longitudinal central body area and a longitudinal cover portion along each longitudinal edge at least slightly wider than each V-brace of the other arch, said second type arch being formed of such panels aligned longitudinally in partial overlapping nesting arrangement, the first type and second type arches being alternately positioned laterally to each other with the longitudinal cover portion of a second type arch spanning and capping the adjacent V-brace of a first type arch, and means for securing the panels and arches together as so arranged.

7. An arched sheet metal building unit comprising laterally displaced arches, each arch made up of rectangular sheet metal panels longitudinally arced in a segment of an arch comprising an integral V-shaped brace formed longitudinally the full length of the panel with the apex of the V-brace on the inside of the arch, the V-brace having transverse uniformly shaped and spaced corrugations terminating in the upper part of the legs forming the V-brace, the corrugations being positioned from one end of the V-brace to the other end, a plurality of such panels longitudinally aligned in partial overlapping nesting arrangement with the lateral corrugations in the V-brace of one panel meshing with the lateral corrugations in the V-brace of an overlapping panel forming the arches, and sheet metal covering means for connecting and covering a succession of such arches.

No references cited.